United States Patent [19]

Smith et al.

[11] 3,986,855
[45] Oct. 19, 1976

[54] METHOD OF MAKING GLASSWARE HAVING A HANDCRAFTED APPEARANCE

[75] Inventors: Charles M. Smith; Dennis M. VerDow, both of Lancaster, Ohio

[73] Assignee: Anchor Hocking Corporation, Lancaster, Ohio

[22] Filed: Feb. 13, 1975

[21] Appl. No.: 549,708

[52] U.S. Cl. .............................. 65/22; 106/40 V; 106/52
[51] Int. Cl.² ............................................. C03C 3/04
[58] Field of Search ..................... 106/40 V; 65/22

[56] References Cited
UNITED STATES PATENTS

| | | | |
|---|---|---|---|
| 2,268,251 | 12/1941 | Haux | 106/40 V |
| 2,381,945 | 8/1945 | Field et al. | 106/40 V |
| 2,955,049 | 10/1960 | Booth | 106/40 V |
| 2,978,340 | 4/1961 | Veatch et al. | 106/40 V |
| 3,744,984 | 7/1973 | Sato | 106/40 V |

*Primary Examiner*—Winston A. Douglas
*Assistant Examiner*—Mark Bell
*Attorney, Agent, or Firm*—Wood, Herron & Evans

[57] ABSTRACT

Glassware having small bubbles or blisters that impart a handcrafted appearance to it is made by metering specially formed decomposable granules into a soda-lime glass melt at the feeder of a glass forming machine. The granules are made by coating or wetting an alkali metal nitrate with sodium silicate aqueous solution. They decompose in the melt, but the water glass coating slows the decomposition rate such that the resulting gas inclusions cannot escape from the melt before it has been formed or set in a desired shape in the forming machine.

11 Claims, No Drawings

METHOD OF MAKING GLASSWARE HAVING A HANDCRAFTED APPEARANCE

The invention relates to the manufacture of glass articles such as tumblers, bottles, vases, and the like, in which a large plurality of small gaseous inclusions are randomly distributed, so as to impart a handcrafted appearance.

Glass articles made in the old "hand shops," where the glass was gathered by hand from a pot or a day tank, frequently contained many small gas bubbles or inclusions. This was particularly true of articles manufactured prior to this century. Such inclusions (which would today be referred to as seeds or blisters) resulted from the rather primitive melting and forming processes then used. Since these imperfections or irregularities were so common as virtually to be characteristic of the early products, they are today regarded as imparting a handmade look to articles, and this appearance is considered by many to have an aesthetic appeal.

Modern production glass forming techniques have evolved to the point that such seeds and blisters occur only infrequently, and they are generally regarded as desirable defects in the automated manufacture of ware. Care is taken to insure that all entrapped gas is dissipated in melting the glass batch, so that bubbles do not carry over into the forming machine, and the usual forming operations (such as pressing and blowing) are controlled so as not to impart seeds. Hence modern production glassware is characterized by an absence of such defects, whereas early hand-made glass was characterized by their presence.

With the present interest in early Americana, it is desirable to produce glassware having the gas inclusions that were once characteristic of handmade glass, but using modern high speed glass forming techniques. In doing so, however, it is also desirable that the production technique be such that it can be used for relatively short runs, utilizing the same conventional soda-lime batch compositions as are used ordinarily for bottles and other articles, so as to avoid melting of a special batch composition, and without extensive modification of the existing forming line.

There are, of course, a number of techniques for deliberately forming seeds in glassware made by hand. Bubbles can be entrapped by pushing a wooden rod into a gob of hot glass, or the gob can be rolled in sawdust, or the glass can be melted incompletely in a pot or in a day tank. However, it can be seen that, while such techniques for deliberately forming seeds are quite feasible in handshop work, they do not lend themselves to practice with modern production equipment, being slow and costly or resulting in seeds in all of the glass from an entire furnace.

In general, modern production techniques have been aimed at eliminating, insofar as possible, all production of seeds or blisters. These inclusions, when they occur at all, are typically the result of unintended and unwanted improper melting of glass making batch. In melting, certain components of the batch (most commonly organics, nitrates, sulphates and carbonates) produce vapors that form bubbles in the molten glass. The melting process includes sufficient "holding" time that the bubbles are able to rise to the surface of the melt and escape, before the glass is formed and cooled. This process is completed in the conventional "fining" stage of the glass melting process. Thus, even where a vaporizing component is deliberately included in a glass batch mix, or added directly to the tank, bubbles formed by it are completely dissipated in the refining step and are gone prior to the forming step. On the other hand, if vapor forming components are added late in the melting process, they may not melt completely, and would appear as stone or unmelted inclusions.

This invention is predicated on the provision of a special, two component, vaporizable additive which is added to the batch downstream of the refiner and which will vaporize slowly enough that the bubbles formed by its vaporization will not have disappeared from the melt prior to the forming step, but which at the same time will vaporize completely before the forming operation, so that no undissolved stone will appear in the final article.

The seed forming constituent which we have invented for this purpose comprises granules of an alkali metal nitrate such as sodium nitrate or potassium nitrate, wetted or coated with sodium silicate aqueous solution, i.e., "water glass." The alkali metal nitrate has a low melting point. (The preferred material, $NaNO_3$, has a melting point of 586° F. and decomposes at 716° F.). These temperatures are well below the temperature of a glass making tank, which for soda-lime glass is ordinarily about 2600° to 2800° F.

It is well known that these nitrates will vaporize if added to a glass batch and will form gaseous nitrogen oxides, commonly referred to as "$NO_x$." However, if the alkali metal nitrate is used by itself, that is, without an overcoating of water glass, it will vaporize so rapidly that the bubbles will be dissipated before they are immobilized in the formed, cooled glass article.

We have found that if water glass is coated on nitrate pellets, this apparently retards the rate of vaporization sufficiently that, if the resulting granules are added at a certain point downstream of the refining of the glass melting tank, the additive will completely vaporize, leaving no residual stone, but the vapor inclusions or bubbles will not be dissipated before the article is formed, and they will be immobilized by the cooling that accompanies forming. The gases form a myriad of tiny bubbles, roughly about 0.1 to 1.5 mm. in diameter, more or less randomly throughout the glass, and impart an appearance very reminiscent of the old handcrafted ware.

Even if the nitrate pellets are coated with water glass, the evolved gases will nonetheless be lost if the resulting granules are added at too early a stage in the process. If the coated granules are included as a part of the raw batch which is charged to the tank, or even if they are added in the refiner, the bubbles will be formed too soon, that is, while the viscosity of the glass is low, and they will be very largely or completely lost, and will not appear in the final article. However, we have discovered that if the granules are metered into the flowing glass stream in the feeder, the timing of bubble formation (in relation to the profiles of glass melt temperature and viscosity) will be such that the added materials are completely melted, but the bubbles are not lost. The feeder, of course, follows the refiner section of the tank and conveys the glass stream from the refiner to the forming apparatus.

The conventional soda-lime glasses of commerce comprise approximately 65 to 75% $SiO_2$, 14 to 17% $Na_2O$, 7 to 12% (MgO + CaO) and up to 3% $Al_2O_3$. With common types of these glasses, the glass temperature in the feeder is usually about 2000 to 2300° F. and its viscosity is about $10^3$ to $10^4$ poise. The glass is usually formed on the order of about 3 to 10 seconds after passing through the orifice at the end of the feeder. By reason of the temperature reduction in forming, viscosity drops rapidly so that bubbles formed in the manner described above are effectively permanently suspended or "frozen" in the article once formed, very shortly after the glass has passed through the feeder.

In carrying out the new process, the nitrate to be coated is used in granular form. Sodium and potassium nitrate are the most readily available alkali nitrates, and each is useful. The granules as purchased will usually pass a 4 mesh screen (having mesh openings of about 4.7 mm.). This is desirably ground to about −20 mesh size prior to addition of the water glass which forms the particles into small agglomerates.

Water glass is a commercially available product and may be made by reaction of $SiO_2$ (from silica sand) with sodium carbonate at high temperature. It also occurs as a by-product in the manufacture of certain aluminum silicate type catalysts. It is well known for use as a bonding agent or adhesive, and is widely used for that purpose.

The formula of water glass is commonly expressed as $Na_2SiO_3$, but its exact composition in terms of percentages of $Na_2O$, $SiO_2$ and $H_2O$ (and in terms of $Na_2O/SiO_2$ ratio) vary, depending upon source. These variations in the liquid material do not appear to make a great difference for purposes of this invention, and the use of water glass herein is not limited to water glass of any precise composition.

One commercially available sodium silicate water solution suitable for use in the method of this invention is sold by Englehard Industries, Newark, N.J., under their designation "X-17-67," and comprises 43% solids (as sodium silicate) with the remainder being water, having the approximate oxide analysis by weight:
15%—$Na_2O$;
28%—$SiO_2$;
57%—$H_2O$.

In that material the ratio of silica to soda is about 1.9, however, this is not critical, and other water glass compositions in which this ratio is in the range of about 1.6 to 3.8, or with sodium solids contents in the range of about 24–57% by weight can also be used.

The nitrate granules should be wetted by the water glass but should not be so wet that large hard lumps would form in storage, which would have to be broken up for use. The water glass is preferably added gradually to the granules with stirring. The preferred size range of the final pellets is about ⅛ to ¼ inch, but this is not critical.

The water glass-wetted pellets are added to the glass stream at a controlled rate, in the feeder. One convenient way of doing this is to add the pellets through a conventional frit feeder, of the type used for adding colorants, upstream about 2–6 feet from the orifice. The rate of addition of pellets will depend upon the quantity of gas inclusions desired, melt temperature, forming method, rate, and other factors. As one example, in the production of 8 oz. glass tumblers of a conventional soda-lime glass at a rate of 3600 pcs. (1800 lbs.) per hour, the granules were added at a rate of 18 lbs./hour. From this it will be apparent that the quantity added the pound of batch is very low, and it has no detrimental effects on the physical properties of the glass composition which would adversely alter the use of the ware in service.

The Prior Art

U.S. Pat. No. 2,381,945 mentions a variety of agents, including nitrates, for use in producing cast refractories which are porous, but it states that the nitrates are "apt to be very unstable thermally and yield their gas too early." That is precisely the problem with the nitrates which, in accordance with this invention, is solved by coating the nitrate with water glass. For a reason unknown to us, the water glass apparently acts as a gas evolution retarding material, and effectively overcomes the instability of the nitrates, if the granules are added to the melt at the proper point.

U.S. Pat. No. 2,955,049 teaches the use of sodium nitrate for making a cellular glass product. The use of water glass is not shown.

U.S. Pat. No. 2,978,340 shows using sodium silicate as a gasifying agent which may be sodium nitrate, to make tiny hollow glass spheres. This was done by making a slurry of sodium silicate, a water insoluble glass-forming oxide (ZnO, MgO, $B_2O_3$, etc.) and a gas forming composition, drying the composition, then gasifying the pellets to form discrete bubbles. The patent also lists other liquid and solid substances which liberate a gas at elevated temperature. In U.S. Pat. No. 2,268,251 calcium carbonate is listed as a gasifying agent for glasses. There, pre-formed hollow building blocks are charged internally with powdered glass mixed with sodium silicate as a binder and calcium carbonate as a gasifying agent. When heated, the calcium carbonate gives off $CO_2$ and the glass grains are softened and are foamed.

As the examples herein show, the gasifying agents used in the prior art methods do not enable articles to be produced in the standard soda-lime melting procedures of today without premature gasification and ultimate loss of the bubbles. Indeed, even sodium nitrate used alone, water glass used alone, or both added separately to the glass making tank, do not yield useful bubble-containing products.

Prior to the discovery of the present method, various attempts were made, unsuccessfully, to produce bubbles which could be used in production to impart a handcrafted appearance to glass articles. These were as follows:

A. A direct current was passed through a melt of soda-lime glass (500 ma at 9 volts for 30 minutes). Bubbles were evolved in the melt, but the electrodes were rapidly destroyed.

B. Two standard reducing agents which produce gases, graphite and coal, were added to the melt about 2 ft. upstream from the orifice. They did produce bubbles, but they also imparted an undesirable color to the article and did not leave it crystal clear.

C. Other ingredients which have been suggested in the past for use in making glass foams do not in general give acceptable results in making shaped solid ware. Deficient in this respect are calcium carbonate, sodium bicarbonate, aluminum sulfate and urea. Either they are too high melting and do not produce gas at the proper time, or they leave residual stone, which is a serious defect.

D. Soda ash ($Na_2CO_3$) was included as a part of the charge to a melting pot. The bubbles evolved early in the melting process and dissipated before the article could be formed.

E. Soda ash added to a soda-lime glass in the feeder did not melt at a sufficient rate and stones were apparent in the ware.

F. A mixture of soda ash and sand was added to the glass melt in the feeder. Bubbles were evolved but the material was not completely melted and solid inclusions remained which imparted an undesirable appearance.

G. Water glass alone was added to molten glass in a crucible but it did not produce bubbles.

H. Water glass and sodium nitrate granules, if added separately (i.e., not in absorbed form), even if added at the feeder, gasify at a high rate that does not result in useful retention of bubbles after forming.

The foregoing are all examples of techniques which proved inoperative for the desired purpose.

The following is an example of the presently preferred method of practicing the invention.

EXAMPLE I

Commercially obtained prills of sodium nitrate (98% minimum priority) were ground in a ball mill to pellets of −20 mesh size. Water glass was slowly poured over the pellets while the pellets were stirred in a large container, in the proportion of ½ ml water glass to each gram of $NaNO_3$. The water glass used had the composition 14.9% $Na_2O$, 28.1% $SiO_2$, and 56.9% $H_2O$, corresponding to 43% solids. This yielded granules of up to ¼ inch in diameter. The coated granules were free flowing, and evidenced no tendency to stick together. The granules were added to a conventional soda-lime glass melt, having the approximate composition:

| | |
|---|---|
| $SiO_2$ | 73.6 |
| $Al_2O_3$ | 0.6 |
| CaO | 9.3 |
| MgO | 0.3 |
| $Na_2O$ | 15.3 |
| $As_2O_3$ | 0.3 |
| $B_2O_3$ | 0.4 |
| | 99.8 |

Glasses of approximately this general composition are widely used in commerce for making glass containers. The glass batch-forming ingredients had been melted in a conventional tank, at a temperature of about 2720° F., for about 8 hours. Following melting, the glass passed through a refiner in which it was held for an average of about 6 hours at about 2300° F. and was then delivered through a feeder to forming apparatus where it was formed into tumblers by a conventional press and blow (molding) operation. The granules were added through a commercially available frit feeder made by Ferro Corp., which is used for adding small quantities of colorant materials to a clear glass melt in the feeder (forehearth) to produce colored ware. The temperature of the glass melt at the feeder was about 2150° F. and its viscosity $10^{3.5}$ poise.

The water glass-coated granules were added to the melt at a rate of about 4.5 gms. per pound of glass. The rate will vary with the number of bubbles desired, the shape of the article, and the specific type of forming operation. The heat of the glass melt in the feeder causes the granules to decompose and produce gases, but the gasification was sufficiently retarded, we believe by the presence of the water glass, and the bubbles were not formed so fast that they were lost from the glass melt before the melt was cooled in the molding operation. No undissolved residual solids were left, and the $Na_2O$ and $SiO_2$ formed by decomposition of the niter and the water glass became an indistinguishable part of the glass network. The bubbles formed in this particular instance were exceedingly fine (about 0.5 mm. dia.) and were homogeneously distributed. By varying the rate of granule addition, the temperature of the glass, and the length of time between granule addition and chilling, more or less bubbles may be made. The completed glass tumbler had a distinctly handmade appearance.

EXAMPLE II

The ratio of water glass to alkali metal nitrate in the granules is not especially critical. It is generally believed to be most suitable if, for each gram of sodium nitrate, between ¼ and 1½ ml of water glass is used.

While several alkali metal nitrates are known, the invention is most usefully practiced with the commercially available sodium nitrate and potassium nitrate, preferably the former because of its lower melting temperature and low cost.

From the foregoing, it can be appreciated that the production of glassware having these gas inclusions can be undertaken without changes in the basic tank glass, merely by adding the coated granules to the flowing stream in the feeder. The injection of the granules in the feeder does not effect the glass upstream in the tank, or in other feeders. The feeder can be operated, or not operated, for specific articles; the composition in the tank need not be changed to accommodate the invention. Moreover, it should also be emphasized that the gas inclusions are produced without stones or unmelted particles which would impart unattractive appearance and which are commercially undesirable.

Having described the invention, what is claimed is:

1. A method of manufacturing glass articles containing a large plurality of small gaseous inclusions to simulate the seeds and blisters that are characteristic of old handcrafted glass articles, said method comprising,
    forming a mixture consisting essentially of pellets of an alkali metal nitrate and sodium silicate aqueous solution, the said solution being absorbed onto the nitrate to form granules,
    the nitrate and solution being mixed at a ratio of 1 gram of said nitrate to approximately ¼ – 1½ ml of said solution,
    separately mixing and melting a soda-lime glass making batch to form a glass melt and delivering the melt to glass article forming apparatus through a feeder,
    metering said granules into said glass melt in said feeder, the heat of the melt causing the granules to form bubbles in the melt, the granules being metered at a rate effective to produce a desired quantity of bubbles in the glass,
    and then molding said articles from said melt before said bubbles have entirely escaped from it.

2. The method of claim 1 wherein said alkali metal nitrate is $NaNO_3$.

3. The method of claim 1 wherein said sodium silicate aqueous solution contains $SiO_2$ and $Na_2O$ in a ratio of approximately 1.6 – 3.8 by weight.

4. The method of claim 1 wherein said ratio is 1 gram of nitrate to about ½ ml of solution.

5. The method of claim 1 wherein said solution has the composition 15% $Na_2O$, 28% $SiO_2$ and 57% $H_2O$.

6. The method of claim 1 wherein said solution has approximately 24 – 57% by weight solids.

7. The method of claim 1 wherein said granules are about 1/8 to 1/4 inch in diameter.

8. The method of claim 1 wherein the said granules are added to the melt at a point at which the temperature of the melt is in the range of about 2000°–2300° F.

9. The method of claim 1 wherein said granules are metered into said feeder with stirring.

10. The method of claim 1 wherein said granules are metered into said feeder through a frit feeder.

11. The method of claim 1 wherein said glass melt is a commercial soda lime glass of the approximate composition, 65 to 75% $SiO_2$, 14 to 17% $Na_2O$, 7 to 12% (MgO + CaO) and up to 3% $Al_2O_3$.

* * * * *